Oct. 5, 1965 F. ALF 3,210,509
METHOD OF AND APPARATUS FOR ELECTROMAGNETICALLY DEFORMING METAL
Filed July 29, 1963 3 Sheets-Sheet 1

Inventor:
Fritz Alf
By Cushman, Darby & Cushman
Attorneys

Inventor:
Fritz Alf
By Cushman, Darby & Cushman
Attorneys

Inventor:
Fritz Alf
By Cushman, Darby & Cushman
Attorneys 3,210,509

METHOD OF AND APPARATUS FOR ELECTROMAGNETICALLY DEFORMING METAL

Fritz Alf, Landshut, Lower Bavaria, Germany, assignor to Deutsche Edelstahlwerke Aktiengesellschaft, Krefeld, Germany, and to Allgemeine Elektricitäts-Gesellschaft, Berlin-Grunewald, Germany Filed July 29, 1963, Ser. No. 298,290
Claims priority, application Germany, Aug. 31, 1962, A 41,053
17 Claims. (Cl. 219—7.5)

The present invention relates to a method of deforming metal by a magnetic field.

It is a familiar fact that an electric current generates forces in the vicinity of its conductor. One practical application of this physical fact is the electric motor. However, quite recently a very special application has been proposed, namely that of using the forces exerted by a magnetic field for deforming metals. This application makes use of the fact that forces act on two electrically conducting materials carrying an electric current. A conductor is capable by induction of generating a current in an electrically conducting workpiece. The primary current and the second current flowing in the work interact and produce a mechanical force which may bring about a change in the shape of the work, in other words deform the work, provided the magnitudes are correctly chosen. In practice this has already been done, for instance, by inserting a small inductor coil into a tube and by passing a heavy discharging current, for instance from a battery of condensers, through the induction coil. The sudden change in the magnitude of the current induces a voltage in the tube surrounding the coil which likewise drives a heavy current. The magnetomotive forces thus engendered urge the tube to expand. If this process is performed in a die which limits and defines the change in shape, then the external shape of such a tube can be changed in the manner that is desired.

The application of this technique has not yet been widely used in production because considerable practical difficulties are found to be involved. The mechanical strength of the materials which it is desired to deform calls for the generation of very considerable forces. Such forces cannot be produced unless very heavy currents are passed through the induction coils. These currents have a similar mechanical effect on the coils, and this usually leads to the destruction of such a coil.

It is the object of the present invention to overcome this particular difficulty. To this end it is proposed to reduce the forces which are required to produce a deformation of a metal part by reducing the resistance to deformation of the part of the metal which it is desired to deform by inductively heating the same. By combining these two processes of magnetomechanical deformation and inductive heating, which are individually each well known, the invention offers the major advantage that the same principal components, such as the induction coil and the battery of condensers, may be used for performing both processes.

By heating the material to temperature levels at which the material is in the plastically deformable state the forces required for its deformation can be reduced to between ⅕ and ⅒ of the forces that would be needed at room temperature. This permits the mechanical strength and the means of fixation of the coils to be of practicable proportions. Moreover, the conductors which feed the coil and the total capacity of the battery of condensers need not be of excessive size.

By suitably matching the temperature to which the workpiece is heated and the forces required for deformation the total power requirement for heating and deformation can be reduced to a minimum. The necessary temperature determines the power requirements of the inductive heating process, which rise with increasing temperatures. On the other hand, rising temperatures reduce the power required for deformation. These contrary effects imply that a minimum power consumption exists for any particular kind of deformation which is required.

The design of the oscillating circuit in induction heating equipment, comprising an induction coil and a battery of condensers, is determined solely by the requirements of inductive heating. In medium frequency plant the oscillating circuit is arranged to comply with the frequency of the feeding generator, in high frequency plant with the best frequency for the treatment. The ratio of inductance to capacity is so chosen that the damping effect of the work on the circuit permits the energy required for heating to be extracted. However, in such an arrangement the magnetomotive forces applied by the induction coil to the work are too small to cause deformations. Without changing the capacity of the battery of condensers it is now proposed by the present invention is to isolate the battery of condensers from the rest of the circuit and to charge the same to a potential by the application of a D.C. voltage until the energy stored in the condensers is sufficient for the induction coil to generate the required deforming forces when the battery is discharged through the coil. This arrangement permits the same battery of condensers to be used for deformation as is used for inductive heating, excepting that the break-down resistance of the condensers must be high enough for the purpose of deformation. In some cases the brief temporary load during the deformation process may permit the normal permissible short period potential overload of the condensers above their rated load to be utilised for producing the required brief surge, thereby avoiding the need of actually improving the normal condenser insulation.

If in certain cases the temporary potential overload is still too high for the condensers to withstand, then it is proposed according to the invention to provide an additional condenser battery for supplementing the condenser battery provided for the inductive heating process, said supplementary battery being connected in parallel with the first. This increase in capacity is of special advantage because it reduces the frequency of the oscillating circuit and thereby increases the mechanical forces which are produced.

The combination of the two systems offers the further possibility of utilising the elements available for inductive heating for the purposes of deformation. The condenser battery may be charged to the required D.C. potential from the network which feeds the oscillating circuit of the induction heating installation. In mains frequency installations this may be the mains network itself. In medium frequency installations it would be the medium frequency generator and in high frequency equipment it would be the high frequency rectifier component of the valve generator. The generation of the high D.C. potential for charging the condenser battery in the case of mains and medium frequency plant may be effected by the interposition of a transformer with a high voltage output, which in its secondary circuit charges the condenser battery through rectifying means and a charging resistor. Particularly in the case of medium frequency plant the higher frequencies will permit the said components to be very small. On the other hand, conventional voltage doubles or multipliers may be arranged to generate the required high voltage behind the A.C. generator.

When the inductive heating process has been concluded the oscillating circuit is isolated by conventional switch means and the condenser is disconnected from the induction coil as well as from the generator circuit. Instead, the condenser is connected to the charging circuit, as has been described. After having been charged to the envisaged high potential the condenser may be reconnected by switch means to the induction coil. It will then immediately discharge through this switching element. However, it is better, according to another feature of the invention, to provide for a spontaneous discharge by providing switch means for instance in the form of a spark gap or a discharge vessel (ionised gap) or the like, which is so designed that its break-down or firing voltage agrees with the voltage to which the condenser is to be charged, so that automatic ignition takes place permitting the condenser to discharge. Special switch means for maintaining the charging voltage and for connecting the battery of condensers to the inductance can thus be saved.

As has already been mentioned, the deformation of the metal parts which are intended to be deformed will generally require the provision of dies which determine the shape resulting from deformation. Conveniently these dies are made of a magnetically permeable material, i.e., of iron or steel, and they will be so designed that these components when they enclose the work will at the same time provide a magnetic return path for the magnetic field of the induction coil. The efficacy and efficiency of the plant is thus considerably improved because a very much better magnetic coupling between the induction coil and the work can be achieved. In order to prevent the flow of current in the die itself, and also for electrical reasons, the die is preferably divided and the parts separated by insulation in such a way that a circulating current through the closed die cannot flow. To this end the contacting faces of the two halves of the die are insulated or they may, for instance, be oxidised.

A convenient form of construction of an installation for inductively heating and simultaneously magnetomotively deforming a workpiece comprises a magnet core on which for instance hollow bodies, special kinds of rings and so forth are intended to be externally deformed. To this end the invention proposes to insert into the ring a magnetically permeable core which also carries the coil generating the magnetic flux for inductively heating and magnetomechanically deforming the ring. This core is preferably additionally provided with a yoke to gather the external leakage flux. This device is especially suited for small parts and will be hereafter described in greater detail by reference to the accompanying drawings.

The drawings are intended to illustrate by way of example the proposed method and the devices required for performing the same.

Figure 1:
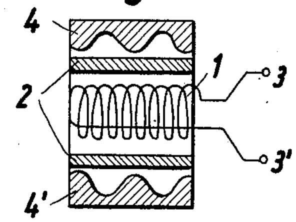
FIG. 1 is a diagrammatic sectional elevation of the apparatus.

FIG. 1 illustrates the principle of the arrangement. The induction coil 1 is closely embraced by the workpiece 2 which is to be deformed. The terminals 3 of the induction coil are connected to an induction heating installation. The metal ring, consisting for instance of aluminium is heated at a temperature of say 400° C. When the heating of the workpiece has been completed the condenser battery which is not shown is discharged through the terminals 3, and coil 1 induces a current in the metal ring 2 which causes the ring to expand. Since the metal ring is surrounded by a die 4 it will expand into the recesses of the die. The die is divided and thus permits the metal ring to be taken out of the die after it has been deformed.

Figure 2:
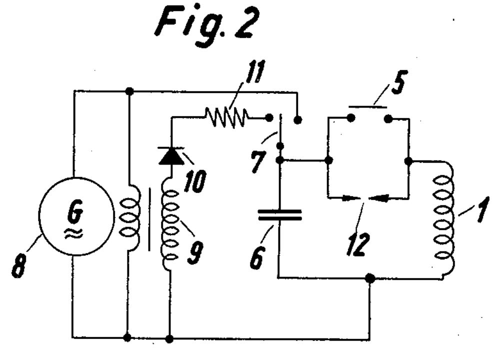
FIGS. 2 and 3 are alternative circuit arrangements.

FIG. 2 is an illustrative diagram of the electrical circuits when a medium frequency plant is used. The induction coil 1 is electrically connected to the condenser battery 6 through a conventional switch 5. A two-way electric switch 7 connects the oscillating circuit thus formed to the medium frequency generator 8 which in the case of mains frequency plant may be replaced by the ordinary mains network. When the heating process has been completed, switch 5 is opened and switch 7 is changed over into the position in which condenser 6 will be charged via transformer 9, charging rectifier 10 and charging resistor 11. As soon as the condenser 6 has been charged to the potential required for deformation it will spontaneously discharge across a spark gap 12 and through the induction coil 1, thus causing the work to deform.

Figure 3:
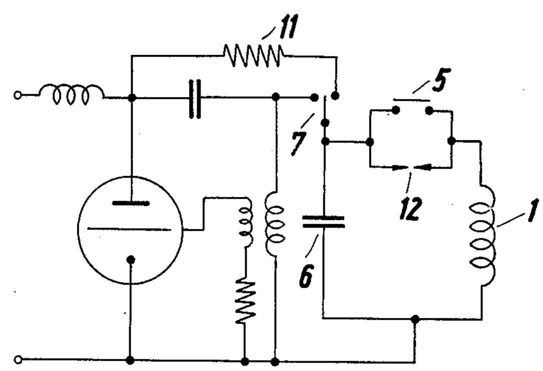

A modification of the same lay-out is illustrated in FIG. 3 which relates to the use of a high frequency generator. The only difference of this circuit from the previous one is that the transformer 9 in FIG. 2 and the rectifier 10 are omitted, the condenser being directly charged from the high tension D.C. circuit of the high frequency generator through the charging resistor 11.

Figure 4:
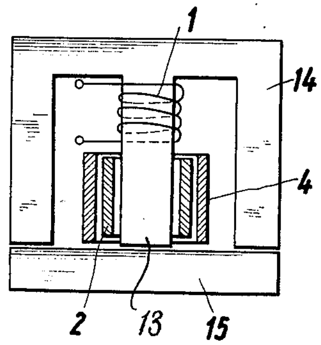
FIG. 4 is a part-sectional elevation of a modified form of the apparatus.

FIG. 4 shows the scheme in principle of a useful arrangement for heating and deforming on a magnet core. The workpiece 2 which is to be deformed surrounds the core 13 and is itself surrounded by the divided die 4, 4[1]. The induction coil 1 surrounds the core alongside the work. The leakage flux of this coil is conducted through the limbs 14, 14[1] to the yoke 15. The yoke 15 is movable to permit the work to be introduced and removed.

Figure 5:
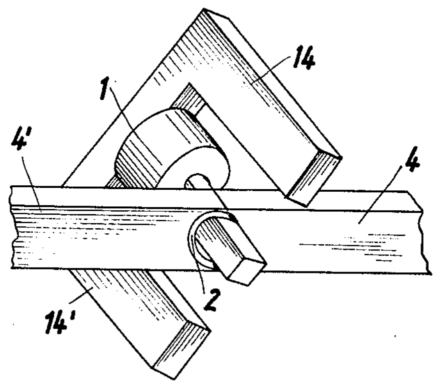
FIG. 5 is a perspective view thereof.

FIG. 5 is the same arrangement as in FIG. 4, shown in perspective. The reference numerals correspond with those used in FIG. 4, the disposition of the several parts being clearly seen. For reasons of greater clarity the yoke 15 is removed in FIG. 5.

Figure 6:
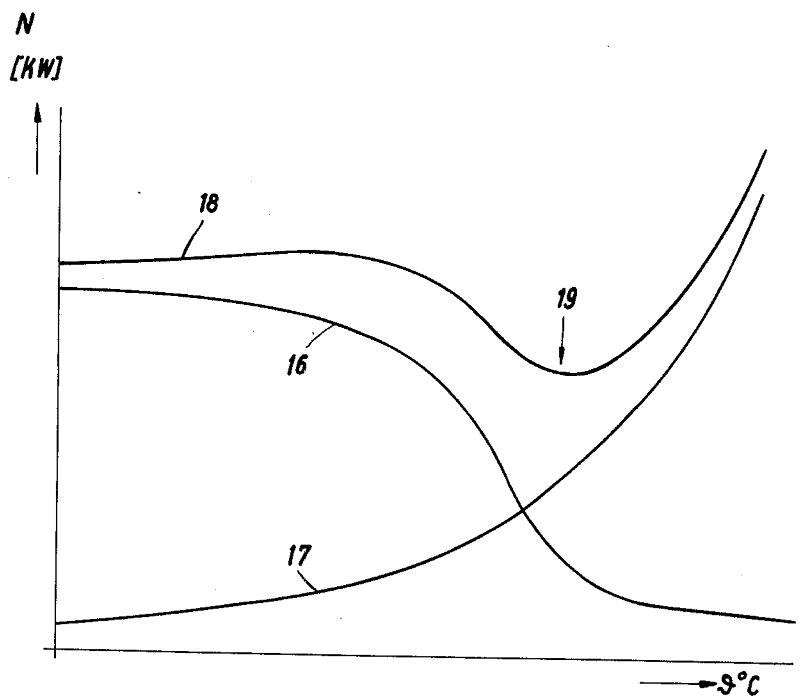
FIG. 6 is a graph showing how the tempearture at which the overall power requirements are at a minimum can be determined.

FIG. 6 illustrates how the temperature at which the overall power requirements are a minimum is determined. In the graph the power is plotted over the temperature. First the installed electrical power which must be available for deforming the treated metal is plotted as a function of the temperature of the metal. This plot is a curve 16. The installed electrical power depends upon the necessary capacity of the condenser battery and the required charging voltage. Both quantities taken together give the required charging energy. However, in a rational production scheme the condenser battery will be required to operate in a given timed working cycle. This working cycle determines the available charging time which in turn in conjunction with the above quantities decides the required installed power.

Secondly, the power required for inductive heating is likewise determined as a function of the temperature of the metal and plotted in a curve 17. Again the power is not solely dependent upon temperature, but also upon the period available for heating, which is itself determined by the production rate. Both curves 16 and 17 in the graph are now added and the resultant curve 18 therefore represents the total power as a function of temperature, which is found to have a minimum at point 19. At this temperature the power required for performing the combined method is a minimum, being the sum of the power required for inductive heating and of the power required for subsequent magneto-mechanical deformation.

What I claim is:

1. The method of electromagnetically forming a metal workpiece which comprises the steps of first reducing the resistance of the metal workpiece to forming by inductively heating the metal with an induction coil in an oscillating circuit energized by an alternating current applied directly thereto; isolating said oscillating circuit from the alternating current source after the heating step; rectifying the alternating current and charging a condenser with a direct current voltage until the energy stored in the condenser is sufficient for the induction coil to generate the required forming forces; and then releasing the stored charge to the coil to form the workpiece in the desired manner.

2. The method of electromagnetically forming a metal workpiece which comprises the steps of first reducing the resistance of the metal workpiece to forming by inductively heating the metal with an induction coil in an oscillating circuit energized by an alternating current applied directly thereto; isolating said oscillating circuit from the alternating current source after the heating step; charging a condenser with a direct current voltage until the energy stored in the condenser is sufficient to enable the induction coil to generate the required forming forces; and then spontaneously discharging the condenser means to the coil through a discharge gap to form the workpiece in the desired manner.

3. The method of electromagnetically forming a metal workpiece which comprises the steps of first reducing the resistance of the metal workpiece to forming by inductively heating the metal with an induction coil in an oscillating circuit energized by an alternating current applied directly thereto; isolating said oscillating circuit from the alternating current source after the heating step; isolating a condenser in the oscillating circuit from the induction coil; charging said isolated condenser and a supplementary condenser with a direct current voltage until the energy stored in the condenser and the supplementary condenser is sufficient to enable the induction coil to generate the required forming forces; and then discharging the said condenser and the said supplementary condenser to the coil to form the workpiece in the desired manner.

4. The method according to claim 1 which comprises charging the condenser from the alternating current source by way of the secondary of a transformer through a rectifier and a charging resistor.

5. The method of electromagnetically forming a metal workpiece which comprises the steps of first reducing the resistance of the metal workpiece to forming by inductively heating the metal with an induction coil in an oscillating circuit energized by an alternating current applied directly thereto; isolating said oscillating circuit when the metal reaches a predetermined forming temperature; charging a condenser with a direct current voltage until the energy stored in the condenser is sufficient for the induction coil to generate the required forming forces; and then releasing the charge to the coil to form the workpiece while the metal is near its predetermined forming temperature, said forming temperature being selected such that the total power required for heating and forming the workpiece is reduced to substantially the minimum.

6. Apparatus for electromagnetically forming a metal workpiece comprising an oscillating circuit adapted to be energized by applying an alternating current directly thereto and including an induction coil for heating the workpiece; a condenser means; means for isolating the oscillating circuit from the alternating current source; means for rectifying the alternating current to supply a direct current charging voltage to the condenser means sufficient when released to the coil to generate the forces necessary for forming the workpiece; and means for releasing the stored energy to the coil.

7. Apparatus according to claim 6 wherein said rectifying means comprises the secondary of a transformer, a rectifier and a charging resistor.

8. Apparatus according to claim 6 wherein said condenser means is part of the oscillating circuit and said oscillating circuit also includes a first switch means operative at the end of the heating process to disconnect said condenser means from the induction coil and the oscillating circuit from the alternating current source so that the condenser means alone will be connected to said source and a second switch means operative to discharge the energy stored in the condenser means to the coil.

9. Apparatus for electromagnetically forming a metal workpiece comprising an oscillating circuit adapted to be energized by applying an alternating current directly thereto and including an induction coil for heating the workpiece; a condenser means; means for isolating the oscillating circuit from the alternating current source following heating by said coil; means operative to produce a direct current voltage in the condenser means sufficient to form the workpiece when supplied to the induction coil; and means for releasing the energy stored in said condenser including a discharge gap.

10. Apparatus for electromagnetically forming a metal workpiece comprising an oscillating circuit adapted to be energized by applying an alternating current directly thereto and including an induction coil for heating the workpiece; means for isolating said oscillating circuit from the alternating current source after the alternating current heating energy has been supplied; a condenser means; means for supplying a direct current voltage to said condenser means; means for releasing the stored energy to the coil to provide the magnetic flux necessary for forming the workpiece; and die means against which the workpiece is formed to determine the contour of the formed workpiece.

11. Apparatus according to claim 10 wherein said die means is made of magnetically permeable material to provide a magnetic return of the coil flux.

12. Apparatus according to claim 10 wherein said die means comprises co-operating components, the opposed surfaces of which are insulated from one another to suppress the generation of a circulating current around the closed die.

13. Apparatus for electromagnetically forming a metal workpiece comprising an oscillating circuit adapted to be energized by applying an alternating current directly thereto and including an induction coil for heating the workpiece; means for isolating said oscillating circuit from the alternating current source; a condenser means; means for supplying to said condenser means a direct current voltage sufficient to enable the induction coil to generate the forces necessary for forming the workpiece; means for releasing the stored energy to the coil; and a magnetically energizable core, said induction coil being mounted on the core and said core being adapted to also receive the metal workpiece alongside said coil so that the workpiece is formed in the desired manner when the stored condenser energy is released to the coil.

14. Apparatus according to claim 13 wherein said core is carried by a U-shaped structure of magnetic flux-conducting material having associated therewith a removable yoke to provide a substantially closed magnetic path while permitting insertion and removal of the workpiece.

15. Apparatus for electromagnetically forming a metal workpiece comprising an oscillating circuit adapted to be energized by applying an alternating current directly thereto and including an induction coil for heating the workpiece; means for isolating said oscillating circuit from the alternating current source; a condenser means; means for supplying to said condenser means a direct current voltage sufficient to enable the induction coil to generate the forces necessary for forming the workpiece; and means for releasing the stored energy to the coil.

16. Apparatus for electromagnetically forming a metal workpiece comprising an oscillating circuit adapted to be energized by applying an alternating current directly thereto and including an induction coil for heating the workpiece and a condenser means to compensate for the damping effect of the workpiece during the heating process; means for isolating said oscillating circuit from the alternating current source; means for isolating the condenser means from the coil; means for supplying to said isolated condenser means a direct current voltage sufficient to enable the induction coil to generate the forces necessary for forming the workpiece; and means for releasing the stored energy to the coil.

17. The method of electromagnetically forming a metal workpiece which comprises the steps of first reducing the resistance of the metal workpiece to forming by inductively heating the metal with an induction coil in an oscillating circuit energized by an alternating current applied directly thereto; isolating said oscillating circuit from the alternating current source after the heating step; charging a condenser with a direct current voltage until the energy stored in the condenser is sufficient for the induction coil to generate the required forming forces; and then releasing the stored charge to the coil to form the workpiece in the desired manner.

References Cited by the Examiner

UNITED STATES PATENTS

| | | | |
|---|---|---|---|
| 2,976,907 | 3/61 | Harvey et al. | 153—10 X |
| 3,088,200 | 5/63 | Birdsall et al. | 29—421 |
| 3,092,165 | 6/63 | Harvey | 153—2 X |

RICHARD M. WOOD, *Primary Examiner.*